(12) United States Patent
Reck

(10) Patent No.: US 9,273,192 B1
(45) Date of Patent: Mar. 1, 2016

(54) METHOD OF PREVENTING MICROBIAL GROWTH ON WATER TREATMENT DISPERSANT

(71) Applicant: George Reck, Aurora, MN (US)

(72) Inventor: George Reck, Aurora, MN (US)

( * ) Notice: Subject to any disclaimer, the term of this patent is extended or adjusted under 35 U.S.C. 154(b) by 0 days.

(21) Appl. No.: 14/534,960

(22) Filed: Nov. 6, 2014

(51) Int. Cl.
*C08K 3/30* (2006.01)
*C08K 3/16* (2006.01)
*A01G 9/02* (2006.01)

(52) U.S. Cl.
CPC ... *C08K 3/30* (2013.01); *C08K 3/16* (2013.01); *C08K 2003/168* (2013.01); *C08K 2003/3045* (2013.01)

(58) Field of Classification Search
USPC ............ 210/200, 201, 202; 106/15.05, 124.1, 106/501.1; 435/254.1, 256.7
See application file for complete search history.

(56) References Cited

U.S. PATENT DOCUMENTS 5,834,409 A * 11/1998 Ramachandran et al. .... 510/125
6,126,947 A * 10/2000 Savion et al. ................. 424/401
2005/0118276 A1 * 6/2005 Lei et al. ....................... 424/490

FOREIGN PATENT DOCUMENTS

JP          10290957    * 11/1998
JP        2011202243    * 10/2011
JP         103145925    *  6/2013

* cited by examiner

*Primary Examiner* — Terressa Boykin

(57) ABSTRACT

A method of preventing microbial growth on water treatment dispersant includes adding a quantity of zinc to a liquid dispersant used for sequestering of alkaline earth metals. The zinc inhibits growth of mold, fungi and bacteria in the liquid dispersant. A mixture is defined that includes the zinc and the liquid dispersant.

11 Claims, No Drawings

METHOD OF PREVENTING MICROBIAL GROWTH ON WATER TREATMENT DISPERSANT

BACKGROUND OF THE DISCLOSURE

1. Field of the Disclosure

The disclosure relates to microbial growth prevention methods and more particularly pertains to a new mold and fungal growth prevention method for preventing the growth of molds and fungi on liquid water treatment dispersant.

2. Description of the Prior Art

Water treatment systems have consistently struggled with a safe and effective way to sequester iron, manganese and calcium in water systems. Water systems have used polyphosphates in the past for the prevention and removal of particular compounds such as calcium carbonate, calcium sulfate, iron and manganese oxides as well as heavy elements such as barium and strontium. Typically the water treatment industry has desired to increase the phosphate content of their treatments in order to control these compounds and elements, but concerns over increasing levels of phosphates in rivers and aquifers has increased the back end cost of removing phosphates before it can be discharged to rivers and streams. Moreover, there has been a general consensus that lowering the phosphate concentrations within waterways is a favorable outcome. Consequently there has been a search for a water treatment compound which will provide the benefits of high control without increasing the amount of phosphates added to the water.

One particularly useful product for this is Polysperse which is a dispersant and phosphate stabilizer made and sold by Pacific Standard Specialties, Inc., located at 14205 Arizona 188, Globe, Ariz. Polysperse, having CAS No. 71050-62-9, is a homopolymer having phosphonate and polyacrylate characteristics and more specifically comprises a poly (acrylic acid-co-hypophosphite) sodium salt. While this product not only sequesters the selected compounds and elements as desired with lower amounts of phosphates than comparable treatment solutions, it has the added benefit of greatly extending the time that iron and manganese are maintained within solution such that neither will precipitate out of the water. This product typically comes in a liquid form and is simply added to water being treated in a conventional manner.

However, a concern has arisen over dispersants such as Polysperse due to their inability, in their usually provided formulations, to prevent the growth of molds, fungi and bacteria. Such growth typically occurs on the surface of the dispersant and has many negative aspects. One problem with molds and fungi growing on the liquid is that it is a precursor for bacterial growth. As can be well appreciated, one would not want to add molds, fungi or bacteria to water being treated as one of the objectives of such treatment is to remove these elements from the water. A second problem is that the molds, fungi and bacteria are utilizing the dispersant as a food source and are therefore necessarily breaking it down and rendering it less effective. This in turn leads to higher costs as additional dispersant will be required for the treatment process. Finally, the growth of these microorganisms on the dispersant is aesthetically unpleasant causing treatment operators to question the quality of the product and lowering their desire to use it.

Multiple possible solutions have been tested to alleviate the above problems but most have not succeeded in their purpose of preventing growth of the microorganisms while simultaneously being economical and non-detrimental to the efficacy of the dispersant product. For example, it was believed that the pH of the product could be lowered to such a point that growth would be inhibited, but it was found that the addition of acids increased the cost of the product above a useful range. Alternatively, it was believed that raising the pH, above 6.0 for example, would also prevent growth. However, raising the pH caused precipitation of existing phosphates and therefore was not feasible. Different additives were also considered such as sodium silicate but the levels at which it could economically be added did not prevent growth as needed. Potassium had similar drawbacks as sodium. Phosphates could be added in the form of sodium phosphates but this would of course counter the goal of using less phosphate. of those compounds. Thus, there still is a need for a method or mixture which provided all of the benefits of the product's ability to sequester and scale remove while preventing the growth of the microorganisms discussed above.

SUMMARY OF THE DISCLOSURE

An embodiment of the disclosure meets the needs presented above by generally comprising adding a quantity of zinc sulfate or zinc chloride to a liquid dispersant which is configured for sequestering of alkaline earth metals and removal of carbonate scale. The zinc inhibits growth of mold, fungi and bacteria in the liquid dispersant, wherein a mixture is defined including the zinc and the liquid dispersant.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

DESCRIPTION OF THE PREFERRED EMBODIMENT

As discussed herein, the method of preventing mold and fungal growth on water treatment dispersant generally comprises adding a quantity of zinc, in the form of zinc sulfate or zinc chloride, to a liquid dispersant configured for sequestering of alkaline earth metals. The zinc inhibits growth of mold, fungi and bacteria in the liquid dispersant and a mixture is defined which includes the zinc and the liquid dispersant.

As stated above, one dispersant which may be used is Polysperse though it should be understood that other dispersants may be utilized. The liquid dispersant may include sodium polyacrylate polymer.

Generally, the amount of zinc in the mixture will be approximately 750 ppm or less. The zinc may be provided as zinc chloride or zinc sulfate. The mixture may contain as much as 1500 ppm zinc chloride or zinc sulfate.

Other mold and fungi growth inhibitors which may be used are copper sulfate and copper chloride which may instead be added to the dispersant.

In use, the addition of the zinc to the dispersant prevents the growth of mold, fungi and bacteria on the surface of the dispersant. The mixture including the dispersant, which is stored in containers, may be added to the water treatment process as needed without fear of the dispersant being unsightly, contaminated by mold, fungi and bacteria, while ensuring that the strength of the dispersant has not been compromised.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A method of preventing microbial fungal growth on a water treatment dispersant, said method comprising the steps of:

providing a liquid dispersant configured for sequestering alkaline earth metals in water;

adding a quantity of zinc said liquid dispersant, said zinc inhibiting growth of mold, fungi and bacteria in said liquid dispersant, wherein a mixture is defined including said zinc and said liquid dispersant.

2. The method of claim 1, wherein said mixture comprises at least 1500 ppm of zinc sulfate or zinc chloride wherein said zinc is provided by said zinc sulfate or said zinc chloride.

3. The method of claim 1, wherein said mixture comprises a zinc content equal to 750 ppm or less.

4. The method of claim 1, wherein said liquid dispersant comprises a sodium polyacrylate polymer.

5. The method of claim 1, wherein said zinc is provided as zinc chloride.

6. The method of claim 1, wherein said zinc is provided as zinc sulfate.

7. A method of preventing microbial fungal growth on a water treatment dispersant, said method comprising the steps of:

providing a liquid dispersant configured for sequestering alkaline earth metals in water;

mixing into said liquid dispersant a quantity of microbial fungi growth inhibitor, said liquid dispersant comprising a sodium polyacrylate polymer.

8. The method of claim 7, wherein said microbial fungi growth inhibitor comprises copper sulfate.

9. The method of claim 7, wherein said microbial growth inhibitor comprises zinc chloride.

10. The method of claim 7, wherein said microbial growth inhibitor comprises zinc sulfate.

11. The method of claim 7, wherein said microbial growth inhibitor comprises copper chloride.

* * * * *